United States Patent [19]

Hampton

[11] 4,191,653
[45] Mar. 4, 1980

[54] SELF WASHING BELT STRAINER

[76] Inventor: Quentin L. Hampton, 129 Anchor Dr., Daytona Beach, Fla. 32019

[21] Appl. No.: 15,795

[22] Filed: Feb. 27, 1979

[51] Int. Cl.$^2$ ............................................. B01D 33/04
[52] U.S. Cl. ...................................... 210/396; 210/400
[58] Field of Search ................. 210/77, 393, 396, 400, 210/401, 386, 160; 209/307; 162/348

[56] References Cited

U.S. PATENT DOCUMENTS

| | | | |
|---|---|---|---|
| 450,094 | 4/1891 | Black | 210/400 X |
| 3,075,333 | 1/1963 | Revell | 210/400 X |
| 3,302,795 | 2/1967 | Jacobs | 210/400 X |
| 4,042,507 | 8/1977 | Langmack | 210/400 X |

Primary Examiner—William A. Cuchlinski, Jr.
Attorney, Agent, or Firm—John N. Randolph

[57] ABSTRACT

An endless driven belt strainer adapted for use as a porous barrier in a channel containing a flowing liquid, such as a channel supplying raw sewage to a treatment plant. The belt strainer is composed of a number of endless porous wire or plastic screen strips arranged in side-by-side relation and which pass over a driving roller, guide rollers and a tension adjusting roller, all of which rotate in a frame having an upwardly inclined bottom portion which slopes away from the direction of flow of the liquid to be cleansed, and a top portion located above the liquid level and equipped with a cleaning means for removing foreign matter from the belt strainer as it commences its return travel. Means is provided for twisting each porous strip 180° during the initial part of its return travel above the flowing stream, so that during a subsequent downward travel of these screen portions the freshly cleansed liquid will pass through this downwardly traveling flight portion for removing any debris clinging to its outer surface. An additional endlessly driven cleaning device operates in front of the upwardly traveling screening surface for removing particles which cannot pass through the screen and are too large or of a nature such that they will not be taken out of the channel by the screen alone.

8 Claims, 7 Drawing Figures

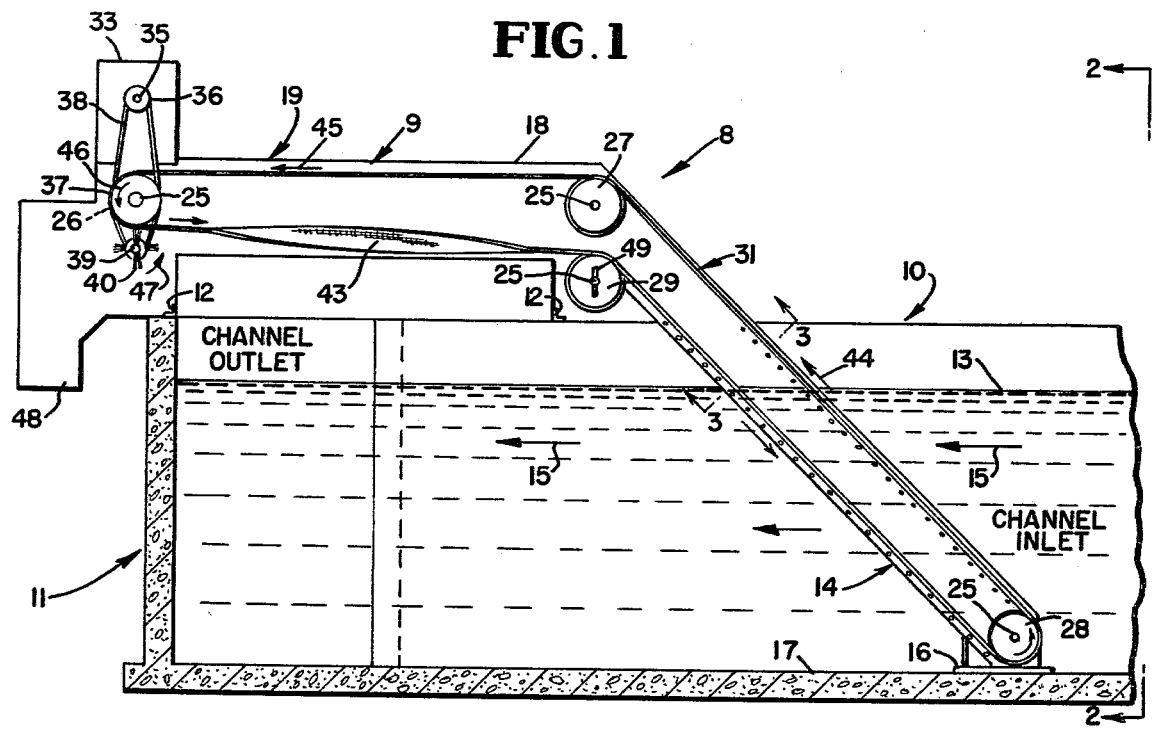
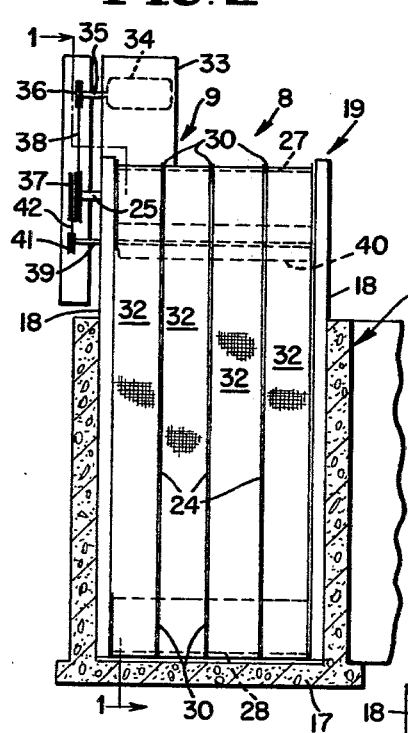
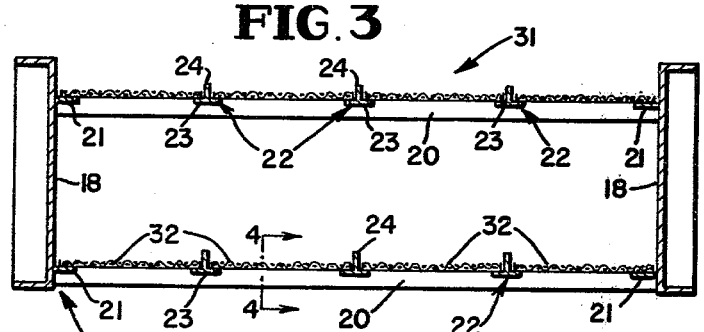
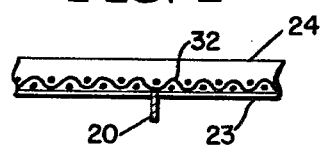
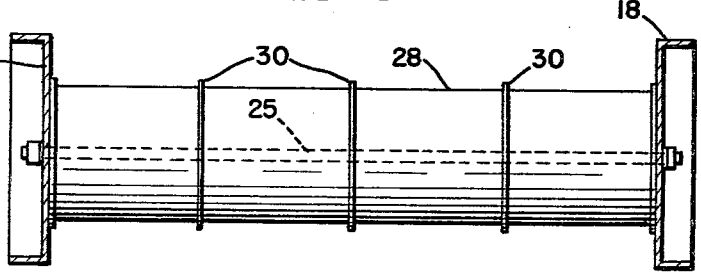

SELF WASHING BELT STRAINER

BACKGROUND OF THE INVENTION

The increasing quantity of paper, plastic, rubber and other such products, used for containers, wrapping, applicators, and other miscellaneous home uses, has resulted in an increasing amount of such materials being discharged into sanitary sewers and carried to sewage treatment plants. Consequently, most sewage treatment facilities need a screening device to remove such materials effectively, to prevent damage to pumps and other mechanical equipment through which the sewage must pass.

SUMMARY

It is a primary object of the present invention to provide a self washing screening device capable of removing the aforementioned materials continuously and without labor from a flowing stream leading to sewage treatment facility, and at a minimum cost.

Another object of the invention is to provide a screening device consisting of a belt strainer which is capable of being twisted during a part of its endless travel so that a just previously cleaned flight portion at all times be presented to the flowing stream and while another flight portion disposed immediately behind said aforementioned flight portion will be washed by the flowing liquid passing therethrough after being initially cleansed in passing through the first mentioned flight portion.

Still a further object of the invention is to provide an endless driven means arranged to operate in front of the flight portion located in a straining position, for removing particles which cannot pass through the screen and cannot be taken out of the channel by the screen alone.

Various other objects and advantages of the invention will herinafter become more fully apparent from the following description of the drawings, illustrating presently preferred embodiments thereof, and wherein:

BRIEF DESCRIPTION OF THE DRAWINGS

FIG. 1 is a longitudinal sectional view taken substantially along the line 1—1 of FIG. 2 and illustrating the self washing belt strainer;

FIG. 2 is a front elevational view thereof taken substantially along a plane as indicated by the line 2—2 of FIG. 1;

FIG. 3 is an enlarged cross sectional view taken substantially along a plane as indicated by the line 3—3 of FIG. 1;

FIG. 4 is a fragmentary sectional view taken substantially along a plane as indicated by the line 4—4 of FIG. 3;

FIG. 5 is an elevational view of one of the belt rollers and showing parts of the frame in which it is mounted;

DESCRIPTION OF THE PREFERRED EMBODIMENTS

Figure 6:
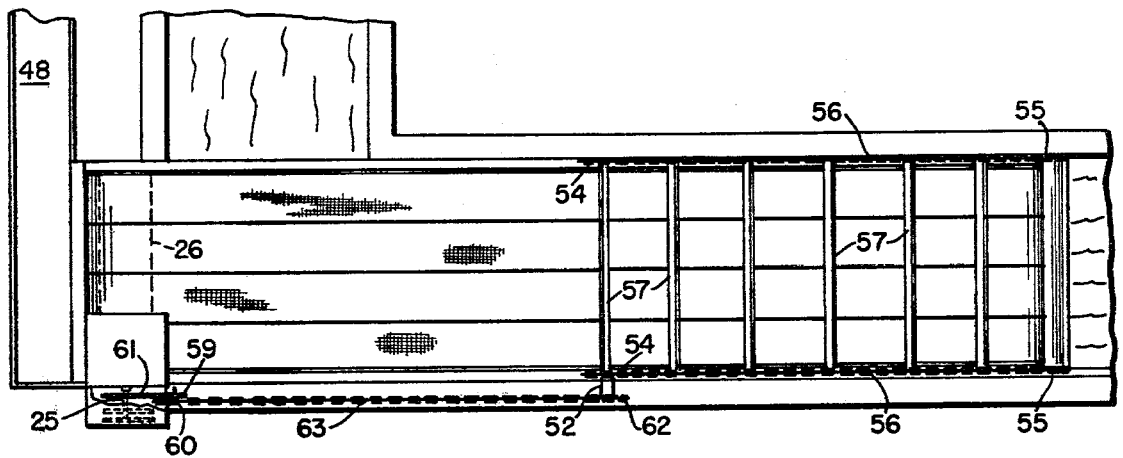
FIG. 6 is a top plan view of a slightly modified form of the self washing strainer.

Referring more specifically to the drawing, and first with reference to FIGS. 1 to 5 illustrating one embodiment of the self washing strainer, designated generally 8, which includes a rigid frame 9 mounted on and secured to a rim 10 of an elongated liquid flow channel 11, by means of brackets 12. The channel 11 may be formed of concrete and provides a passage for a flowing liquid 13, such as raw sewage, which may lead to a sewage treatment plant.

The frame 9 which is mounted on the open top or rim 10 of the channel 11 has a downwardly inclined end 14 which extends into the channel 11 in an upstream direction, relative to the direction of flow of the liquid 13, as indicated by the arrow 15. The frame portion 14 terminates in a base 16, constituting one end of the frame 9, which rests on and may be secured to the channel bottom 17.

As seen in FIGS. 2 and 3, the frame 9 includes side portions 18 which constitute parts of the inclined end portion 14, and also parts of a nearly horizontal top portion 19. Portions of the sides 18, which constitute parts of the end portion 14, are connected to one another by rigid cross members 20. Longitudinally extending bars 21, FIGS. 3 and 4, are support in recesses in the ends and upper edges of the cross members 20 and abut inner sides of the side portions 18. Longitudinally extending spacing members 22 have bottom portions or bars 23 which are secured in recesses of the upper edges of the cross members 20 and each is provided with an upstanding flange 24.

Shafts 25 extend transversely of the frame 9 and are each journaled in the two sides 18 thereof. Rollers or pulleys 26, 27, 28 and 29 are fixed to said shafts and disposed between the frame sides 18. At least certain of the rollers, as best seen in FIG. 5, are provided with spaced annular outwardly projecting flanges 30 which are equally spaced apart.

An endless belt strainer, designated generally 31, is composed of four endless porous wire or plastic screens 32 which are trained over the four rollers or pulleys 26, 27, 28 and 29. A greater or lesser number of screen strips 32 could be provided. Strips 32 are separated from one another by the flanges 24 and 30 and are supported between the rollers or pulleys by the bars 21 and 23.

The shaft 25 of the roller 26 extends outwardly from one frame side 18 and is located adjacent to the end of the frame disposed opposite to the base 16. Said frame end has an upstanding portion 33 in which is mounted an electric motor 34. An armature shaft 35 of the motor 34 has a belt pulley 36 fixed thereto. A double grooved belt pulley 37 is fixed to the shaft 25 of roller 26, beneath the belt pulley 36. An endless belt 38 is trained over the belt pulley 36 and around one annular groove of the belt pulley 37.

A shaft 39 is journaled in the frame sides 18 and has a brush 40 secured thereto and disposed beneath the drive roller 26. A belt pulley 41 is fixed to the shaft 39 and an endless belt 42 is trained over said belt pulley 41 and over the other groove of the belt pulley 37, for rotating the shaft 39 and brush 40 simultaneously with the drive roller 36. The endless strips 32 pass between the roller 36 and the brush 40. As seen in FIG. 1, each endless strip 32 is twisted 180°, as indicated at 43, between the drive roller 26 and the roller 29.

From the foregoing, it will be seen that the liquid 13, flowing from right to left of FIG. 1, will initially pass through the portion of the strainer 31 which is moving upwardly between the roller 28 and 27, as indicated by the arrow 44, so that any foreign matter such as paper, plastic, rubber and other products used for containers, wrappings, applicators and other home uses, will be caught by said upwardly traveling screen portion 31, as the liquid 13 passes therethrough, and will be conveyed upwardly and along the top portion of the strainer 31 which is traveling between the rollers 27 and 26, as indicated by the arrow 45. A part of such material, not shown, will be discharged from the drive roller 26 as the strainer 31 passes around said roller, in the direction indicated by the arrow 46, and the remainder thereof will be removed by the brush 40, which is rotating in a direction as indicated by the arrow 45, as the strainer 31 passes between the roller 26 and said brush 40. All of this foreign material will be discharged into a chute 47 from which it will be carried off laterally from the frame 9.

The strips 32 by being twisted a half revolution, as indicated at 43, during their travel between the roller 26 and the roller 29, will cause the outer or front sides of said strips 32, during their upper travel between the rollers 28 and 27, to become the under or rear sides of said strips during their downward travel between the rollers 29 and 28, so that the cleansed liquid 13, after passing through the upwardly traveling strainer portion 31, will pass through the downwardly moving strainer portion for removing any dirt or foreign matter which might be clinging to the outer or rear side thereof. The roller 29 is provided with adjustment means 49 by which it can be raised or lowered for tensioning the strainer 31.

Figure 7:
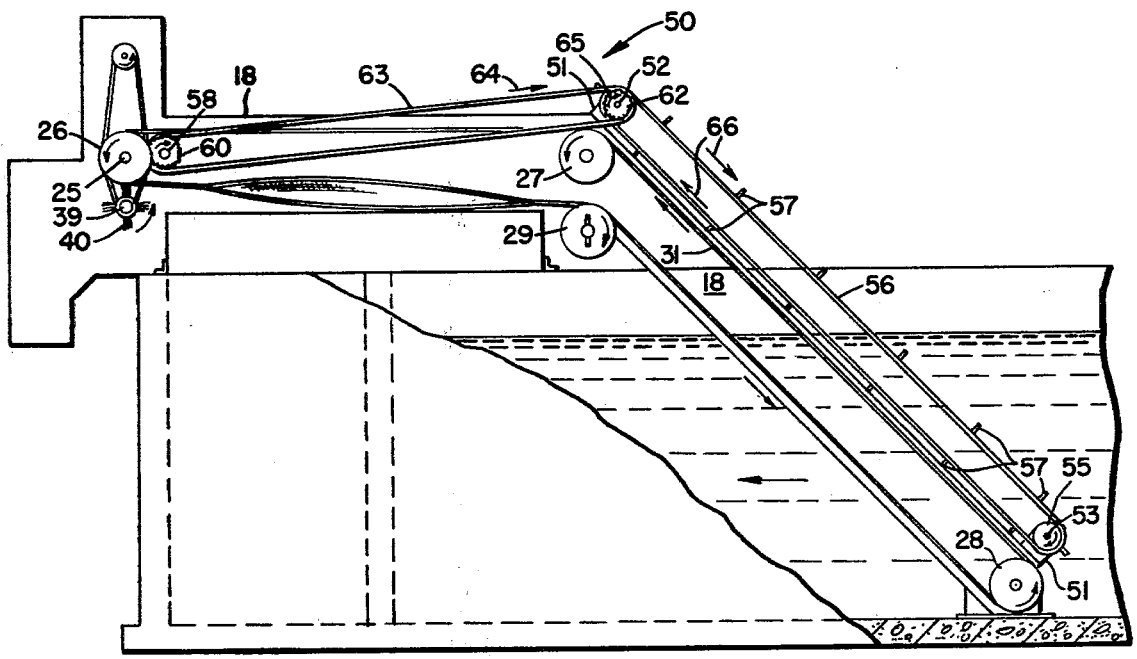
FIG. 7 is a side elevational view thereof.

FIGS. 6 and 7 illustrate another embodiment of the invention including all of the structure previously described and as illustrated in FIGS. 1 to 5, and which structure bears the same reference numerals in FIGS. 6 and 7. The self washing belt strainer 50 of FIGS. 6 and 7 additionally includes supports 51 which are fixed to and extend upwardly from the portions of the frame sides 18 which are disposed between the rollers 27 and 28. A shaft 52 extends through and is journaled in the upper pair of transversely aligned supports 51, and a shaft 53 extends through and is journaled in the other lower pair of supports 51. Shaft 52 has a pair of spaced sprocket wheels 54 fixed thereto and located adjacent the supports 51 of said shaft. The shaft 53 has a pair of sprocket wheels 55 secured thereto and in the same location as the sprocket wheels 54. Endless chains 56 are trained around the longitudinally aligned sprocket wheels 54 and 55. Bars 57, forming sweeper members, extend transversely between and are secured at their ends to the two chains 56.

A stub shaft 58 is fixed to and extends outwardly from the frame side 18 located adjacent the shaft 25 to rotatably support a pinion 59 and a sprocket wheel 60 which are connected together to rotate as a unit. The pinion 59 meshes with a gear 61 secured to the shaft 25, so that the pinion 59 and sprocket wheel 60 will be driven by the shaft 25 and in the opposite direction relative to the direction of rotation of said shaft 25, as indicated by the arrows in FIG. 7. A sprocket wheel 62 is secured to an end of the shaft 52, and an endless chain 63 is trained around the sprocket wheels 60 and 62 and moves in the direction as indicated by the arrow 64 for driving the shaft 52 in the direction indicated by the arrows 65 in FIG. 7, to cause the flights of the chains 56 to move in a direction as indicated by the arrows 66.

Accordingly, the inner or rear flights of the chains 56 will travel upwardly and in the same direction as the upwardly traveling front flight of the strainer 31 and at the same speed, so that the sweeper bars 57 which project from said inner or rear flight of the chains 57 toward and substantially into contact with said upwardly traveling strainer flight, will pick up any foreign matter on said front strainer flight for removing any particles which will not pass through the strainer flight and are too large or of a nature such that they will not be taken out of the channel by the strainer flight alone. Thus, such particles, not shown, will be conveyed up and over the roller 27 to then move horizontally with the strainer 31 toward the roller 26. The remainder of the belt strainer 8, as illustrated in FIGS. 1 to 5, functions in the same manner as previously described.

Various other modifications and changes are contemplated and may be resorted to, without departing from the function or scope of the invention.

I claim as my invention:

1. A self washing belt strainer comprising a rigid frame adapted to be secured partially in and partially above a flowing stream of liquid, a plurality of rollers rotatively mounted in said frame, an endless strainer trained over said rollers including an inclined front flight portion and an inclined rear flight portion each partially submerged in the flowing stream and each inclined in a direction away from the direction of flow, drive means connected to one of said rollers, said strainer including a top flight portion forming a continuation of the upwardly traveling front flight portion and a bottom flight portion disposed directly beneath said top flight portion, a driven cleaning means disposed beneath said aforementioned rollers and around which said top and bottom flight portions travel for cleaning said bottom flight portion, said bottom flight portion being twisted 180° between said roller and a second roller over which said bottom flight portion is trained before commencing its inclined downward travel into the flowing stream, whereby the liquid of the flowing stream after being strained by the upwardly traveling inclined front flight portion will pass through said downwardly traveling rear flight portion for dislodging any foreign matter clinging to the outer downstream side thereof.

2. A self washing belt strainer as in claim 1, said strainer comprising a plurality of endless belts.

3. A self washing belt strainer as in claim 2, said frame including cross members supporting and separating the belt portions constituting said front and rear flight portions.

4. A self washing belt strainer as in claim 2, at least certain of said rollers having flanges between which said belt portions engage in passing around said rollers.

5. A self washing belt strainer as in claim 1, said cleaning means comprising a rotary brush rotatively supported in the frame directly beneath said aforementioned roller and connected to said drive means for driving the endless strainer and said rotary brush.

6. A self washing belt strainer as in claim 1, bearings fixed to and projecting forwardly from end portions of one frame part, shafts journaling said bearings, a pair of sprockets fixed to each shaft, chains trained over aligned sprockets of the two shafts, sweeper blades extending between and secured to said chains, and means connecting said drive means to an upper one of said last mentioned shafts for driving a rear flight of said chains in an upward direction in front of said front flight portion of the strainer, whereby particles which cannot pass through the screen or be carried off by the screen alone will be removed from the channel.

7. A self washing belt strainer as in claim 1, and means supported by said frame for carrying off foreign material which cannot pass through the strainer.

8. A self washing belt strainer as in claim 1, debris collecting means supported by the frame for receiving foreign matter dislodged from said endless strainer.

* * * * *